J. H. DUNLAP AND K. B. KILBORN.
STREAM LINE SHIELD.
APPLICATION FILED JUNE 29, 1918.
1,406,945.
Patented Feb. 14, 1922.
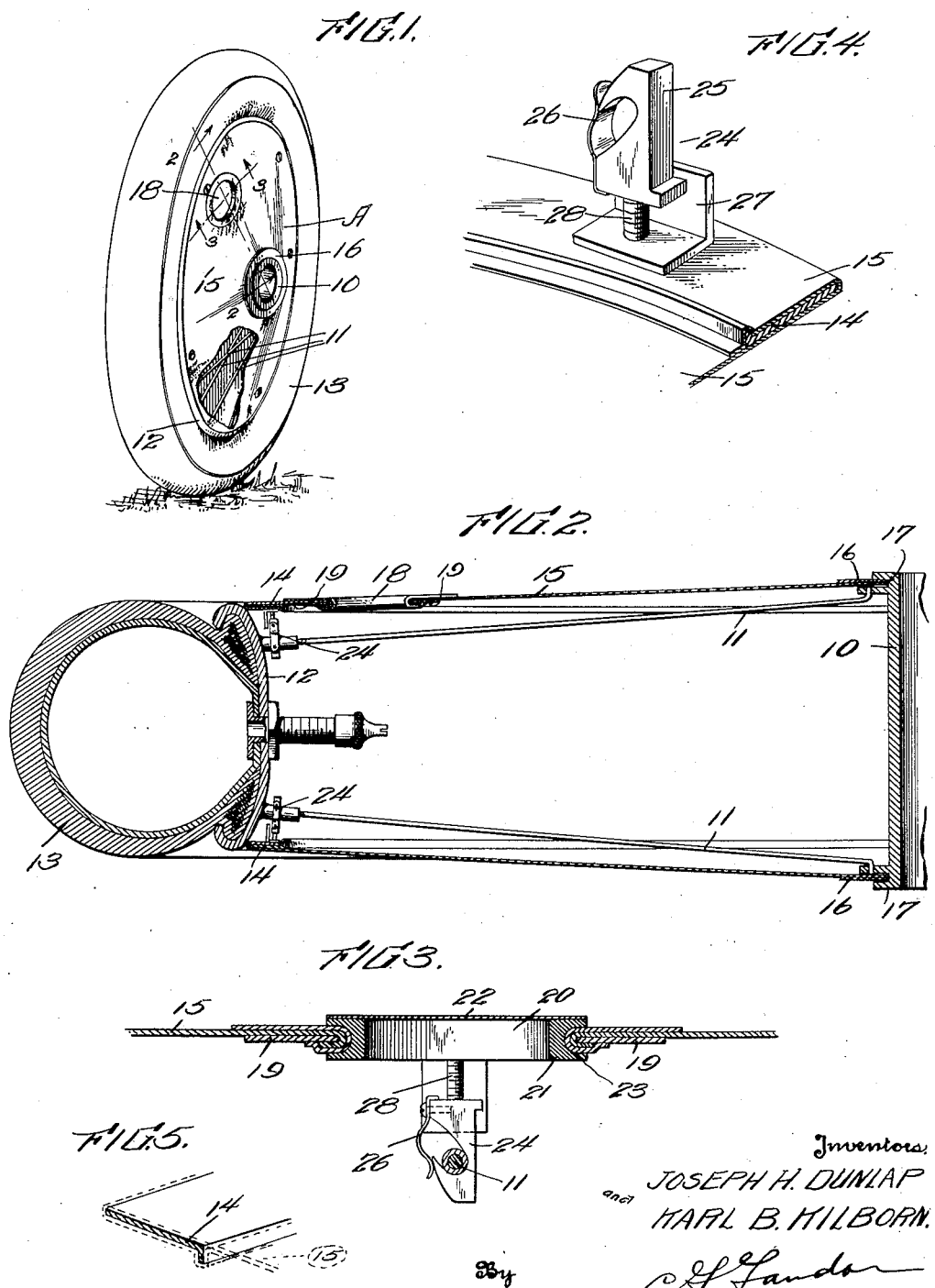

UNITED STATES PATENT OFFICE.

JOSEPH H. DUNLAP AND KARL B. KILBORN, OF AKRON, OHIO, ASSIGNORS TO THE GOODYEAR TIRE & RUBBER COMPANY, OF AKRON, OHIO, A CORPORATION OF OHIO.

STREAM-LINE SHIELD.

1,406,945.   Specification of Letters Patent.   Patented Feb. 14, 1922.

Application filed June 29, 1918. Serial No. 242,616.

*To all whom it may concern:*

Be it known that we, JOSEPH H. DUNLAP and KARL B. KILBORN, citizens of the United States, residing at Akron, in the county of Summit and State of Ohio, have invented new and useful Improvements in Stream-Line Shields, of which the following is a specification.

Our present invention relates to new and useful improvements in aeroplane wheels and has particular reference to improvements in the wind shields which are applied to aeroplane wheels for the purpose of imparting stream lines to the wheels that they may offer a minimum resistance when the aeroplane is in flight.

One of the principal objects of our invention is to improve the fastening means by which the shield is attached to the wheel, so that the shield may be very quickly attached or detached.

Another important object of our invention is to improve the construction of the shield itself making the shield light, but stiff and durable.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which similar reference numbers designate corresponding parts:

Fig. 1 is a perspective view of an aeroplane wheel equipped with our improved shield, a portion of the shield being broken away to better illustrate the relation of the shield to the spokes;

Fig. 2 is a section on line 2—2 of Figure 1;

Fig. 3 is a section on line 3—3 of Figure 1;

Fig. 4 is a detailed perspective view of a portion of the shield at the rim, illustrating one of our improved attaching clips applied to the shield rim; and Fig. 5 is a perspective view of a portion of the rim to which the fabric, forming the shield, is attached.

Before taking up a detailed description of the shield and its attaching means, we desire to explain that while we have herein illustrated the shield in connection with a particular type of aeroplane wheel and rim, the shield is nevertheless generally applicable to all types of aeroplane wheels requiring but minor modifications in proportions and the dimensions of its parts to adapt it to the different designs of wheels and rims.

In the drawings we have illustrated our shield, which is designated in Figure 1 as an entirety by the letter "A," as applied to a wheel, comprising a hub 10, spokes 11, and rim 12, whereon the tire 13 is supported in the usual manner.

As illustrated particularly in Fig. 2, it is customary in many types of aeroplane wheels to use wire spokes and to have two spaced series of such spokes. The spokes of each set are usually attached at their outer ends to the under face of the rim and are generally located some distance inwardly of the outer edges of the rim.

The shield "A" is intended, of course, to impart a stream line conformation to the wheel and it is, therefore, desirable that the outer edge of the shield be approximately tangent to the outermost edge of the rim.

Our present shield comprises a rim 14, (which has preferably the L shaped section shown in detail in Fig. 5) and a sheet of rubberized fabric or other suitable material 15, which is sewed, cemented or otherwise properly attached at its outer edge to the rim 14, preferably in the manner shown in detail in Fig. 4.

At the center of the fabric sheet is an opening which receives the wheel hub 10 and has a bound edge as indicated at 16, which bound edge (in the type of wheel shown in the drawing) seats in an annular groove or channel formed at each end of the hub by outstanding flanges 17.

A normally closed opening 18 is also formed in the shield, permitting access to the valve stem of the tire. A stiffening ring 19 is provided for this opening to prevent tearing or ripping of the fabric around the opening and to serve as a means for securing the closure disc 20 in place.

This closure disc 20 comprises preferably a rubber ring 21 and a circular sheet of fabric 22 which is cemented or otherwise properly secured to the ring to cover the opening defined thereby. In the outer edge of the ring is formed an annular groove 23 which receives the stiffening ring 19 when the closure disc is seated in place as illustrated in detail in Fig. 3. It will be apparent that the deformability of the rubber ring permits this member to be applied to or removed from the stiffening ring 19 in the manner required.

As a means for attaching the rim of the shield to the wheel so that the rim will be snugly held against the outer edge of the wheel rim 12, we provide the shield rim at spaced intervals with attaching clips 24 which are adapted to engage with the spokes. Each attaching clip (as detailed in Fig. 4) comprises a rigid hook-shaped jaw 25; a reversely curved leaf spring jaw 26, which is attached to the jaw 25 and serves as a closer for the hook portion thereof; an L shaped plate 27, which is soldered, welded, riveted or otherwise suitably secured to the shield rim, and a stove bolt 28, which passes through the shield rim 14 and through the face of the plate 27, being threaded into the hook or jaw plate 25.

The manner in which the clip is adapted to be attached to the spoke is illustrated in Fig. 3 wherein it will be seen that the inclined edge 29 of the beak portion of the hook may be engaged with the spoke and the shield rim moved inwardly toward the spoke, thereby causing the spoke to be forced between the spring and the hook and into the enclosure defined by these members.

After the hook is properly engaged with the spoke, the bolt 28 is threaded inwardly to draw the shield rim and hook together and the shield rim is thereby snugly engaged with the wheel rim as in Fig. 2. The function of the plate 27 will now be apparent for it will be observed that the leg portion of this plate holds jaw 25 against rotation during the manipulation of the screw.

When the shield is to be removed the screws are disengaged from the hooks and the shield then pulled off, the fabric, where it surrounds the hub, being pulled out of the groove.

When the shield is removed the hooks remain upon the spokes from where they can be quickly removed by manual separation of the spring from the hook, and then attached to the shield rim by a slight threaded engagement with the screws. Thus the hook will be attached to the shield rim ready for the next application of the shield to the wheel

What we claim is:

1. In a shield of the character described for use in connection with aeroplane wheels, an annular rim, a circular cover attached to the rim, a plurality of snap fasteners for attaching the rim to the wheel, and means for drawing said rim against the rim of said wheel.

2. A shield of the character described for use in connection with an aeroplane wheel comprising, a relatively stiff annular rim, a circular cover supported by the rim, a plurality of snap fasteners projecting from the inner side of the rim adapted to be engaged with the spokes of the wheel whereby the shield is detachably mounted upon the wheel, and means associated with the snap fasteners for drawing the rim against the rim of the wheel.

3. A wind shield for airplane wheels comprising a flexible cover having a semi-rigid marginal portion, a plurality of members mounted upon the marginal portion for adjustment respectively laterally thereof, and a device mounted upon each member adapted to grip a spoke of the wheel upon being pressed thereagainst.

4. In a stream line shield for aeroplane wheels, a rim, means for attaching the rim to a wheel, a fabric cover cooperating with the rim having an opening therein affording access to the interior thereof, a relatively stiff annular member defining the opening, a closure for the opening comprising a ring having a groove in its outer periphery, and a fabric cover for the ring said groove being adapted to receive the ring defining the opening.

5. A stream line shield for use in connection with aeroplane wheels comprising an annular rim, a cover carried thereby and means for detachably connecting the rim to the wheel, said means comprising a rigid jaw and a spring jaw, said jaws being adapted to be forced by pressure from the outside of the jaws on to the spokes of the wheel.

6. In a shield of the character described for aeroplane wheels, a rim, a cover therefor, a rigid hook-shaped jaw, a yieldable jaw coacting therewith, said jaws being adapted, when the shield is applied to the wheel, to engage the spokes thereof, and means detachably connecting the rigid and the flexible jaws to the rim.

7. A shield of the character described for use in connection with aeroplane wheels, including an annular rim, a cover therefor, an L-shaped plate secured to the inner face of the rim and a hook-shaped rigid jaw, a flexible gripping jaw associated with the rigid jaw, said jaws being adapted to be engaged with the spokes of the wheel by application of pressure against the outside of the rim and a stove bolt threaded through the rim and the plate for engagement with the rigid jaw for connecting the jaws to the rim, said L-shaped plate acting to maintain the jaws against rotation during manipulation of the stove bolt when the rim is being applied to or removed from the wheel.

8. A wind shield for aeroplane wheels, comprising a flexible circular cover having a substantially semi-rigid outer edge portion, spoke gripping devices mounted upon the cover for attaching the cover to the wheel said devices being respectively operable while in engagement with the spokes to adjust the outer edge portion of the cover laterally of the spokes.

9. A wind shield for aeroplane wheels, comprising a flexible cover having a semi-rigid marginal portion, a plurality of members rotatably mounted upon the marginal portion for adjustment from the exterior of the shield laterally thereof, devices mounted upon each rotatable member operable to grip a spoke of the wheel, and means mounted upon the marginal portion adapted to prevent rotation of the devices upon rotation of the members.

In witness whereof, we have hereunto set our names in the presence of two subscribing witnesses.

JOSEPH H. DUNLAP.
KARL B. KILBORN.

Witnesses:
R. S. TROGNER,
B. J. McDANEL.